US012269782B2

United States Patent
Palacios

(10) Patent No.: US 12,269,782 B2
(45) Date of Patent: *Apr. 8, 2025

(54) COLOURED FIBER CEMENT PRODUCTS AND METHODS FOR THE PRODUCTION THEREOF

(71) Applicants: Sociedad Industrial Pizarreño, Santiago (CL); Etex Services NV, Kapelle-op-den-Bos (BE)

(72) Inventor: Rodrigo Palacios, Santiago (CL)

(73) Assignees: Sociedad Industrial Pizarreño, Maipú (CO); Etex Services NV, Kapello-op-den-Bos (BE)

(*) Notice: Subject to any disclaimer, the term of this patent is extended or adjusted under 35 U.S.C. 154(b) by 249 days.

This patent is subject to a terminal disclaimer.

(21) Appl. No.: 18/101,347

(22) Filed: Jan. 25, 2023

(65) Prior Publication Data

US 2023/0159400 A1    May 25, 2023

Related U.S. Application Data

(63) Continuation of application No. 15/737,944, filed as application No. PCT/EP2016/064264 on Jun. 21, 2016, now Pat. No. 11,591,269.

(30) Foreign Application Priority Data

Jun. 29, 2015 (EP) .................... 15174314

(51) Int. Cl.
| | |
|---|---|
| C04B 41/00 | (2006.01) |
| C04B 14/30 | (2006.01) |
| C04B 20/00 | (2006.01) |
| C04B 26/06 | (2006.01) |
| C04B 41/48 | (2006.01) |
| C04B 41/63 | (2006.01) |
| C04B 103/54 | (2006.01) |
| C04B 111/21 | (2006.01) |
| E04C 2/06 | (2006.01) |

(52) U.S. Cl.
CPC .......... *C04B 41/009* (2013.01); *C04B 14/308* (2013.01); *C04B 20/0048* (2013.01); *C04B 26/06* (2013.01); *C04B 41/483* (2013.01); *C04B 41/63* (2013.01); *E04C 2/06* (2013.01); *C04B 2103/54* (2013.01); *C04B 2111/21* (2013.01)

(58) Field of Classification Search
None
See application file for complete search history.

(56) References Cited

U.S. PATENT DOCUMENTS

| | | | |
|---|---|---|---|
| 1,829,187 A | 10/1931 | Piessevaux | |
| 3,095,346 A | 6/1963 | Sfiscko et al. | |
| 3,608,261 A | 9/1971 | French et al. | |
| 5,718,943 A | 2/1998 | Hsu et al. | |
| 6,376,570 B1 | 4/2002 | Zhao et al. | |
| 2009/0004468 A1* | 1/2009 | Chen | C04B 41/483 524/451 |
| 2009/0162602 A1 | 6/2009 | Cottier et al. | |
| 2011/0230617 A1* | 9/2011 | Haremza | G03F 7/031 252/182.17 |
| 2014/0248435 A1* | 9/2014 | Hammerli | C04B 41/009 427/314 |

FOREIGN PATENT DOCUMENTS

| | | |
|---|---|---|
| EP | 0192627 B1 | 5/1992 |
| EP | 0 754 663 A1 | 1/1997 |
| EP | 1 914215 A1 | 4/2008 |
| EP | 2036871 A1 | 3/2009 |
| EP | 2792461 A1 | 10/2014 |
| WO | 03/022939 A1 | 3/2003 |
| WO | 2004087412 A1 | 10/2004 |
| WO | 2004113248 A2 | 12/2004 |
| WO | 2009006304 A1 | 1/2009 |
| WO | 2009006333 A1 | 1/2009 |

(Continued)

OTHER PUBLICATIONS

Paris & Chusid—Davis-Colors—Ensuring-the-Quality-of-Colored-Concrete-Finishes-Technical-Notes-896630 (Year: 1998).*
Sreeram—nanosize iron oxide transparent pigment + motivation—2006 (Year: 2006).*
Marketing Material Eternit (Schweiz) AG Jan. 2012.
Marketing Material Eternit (Schweiz) AG.
Cladding for Creative Architecture; www.cembrit.com; Dec. 2008.
Cladding for Creative Architecture; www.cembrit.com; No. 001; Jan. 2013.
Ivarsson; Frontline®Natura; Mar. 2009; 20112 DK.
English Translation—Ivarsson; Frontline®Natura; Mar. 2009; 20112 DK.

(Continued)

*Primary Examiner* — John Vincent Lawler
(74) *Attorney, Agent, or Firm* — Dilworth & Barrese, LLP

(57) ABSTRACT

The present invention relates to coloured fiber cement products as well as to methods for manufacturing such products. In particular, the present invention provides coloured fiber cement products, which fiber cement products are coloured in the mass, and at least comprise on at least part of their outer surface one or more cured layers of a coating composition, which composition at least comprises a binder and a pigment and/or a filler and is characterized by a pigment volume concentration (PVC) of between about 1% and about 20%. The present invention further provides processes for producing these coloured fiber cement products. Finally, the present invention provides uses of the coloured fiber cement products as building materials. In particular embodiments, the fiber cement products produced by the processes of the present invention can be used to provide an outer surface to walls, both internal as well as external, a building or construction, e.g. as façade plate, siding, etc.

12 Claims, No Drawings

(56) References Cited

FOREIGN PATENT DOCUMENTS

WO      2016202680  A1    12/2016

OTHER PUBLICATIONS

Environment_Product_Declaration; Swisspearl, FibreCem Holding AG (issue date: Jun. 13, 2013).
Environmental Product Declaration; Eternit Equitone Natura Façade Panels, Eternit Equitone Textura Façade Panels, Eterplan Structural Panels Eternit AG (issue date: Jan. 14, 2013).
EuroPanels, Equitone [natural].
Stitt et al.; Surface coatings in the fibre cement industry; Surface Coatings Australia (Nov. 1997); 28-32.
Iron(III) oxide—Wikipedia (Year: 2018).
Lascar—EP 0192627 A1 MT—coating composition for building materials—1986 (Year: 1986).
Davis-Colors-Ensuring-the-Quality-of-Colored-Concrete-Finishes-Technical-Notes-896630 (Year: 1998).
05-Schnabel—pigments and hydraulic binder (Year: 2008).
Lowes—Quikrete Cement Color Mix—Sep. 2019 (Year: 2019).
Equitone_Planning_and_Application_Guide—dated Jun. 2013 (Year: 2013).

\* cited by examiner

COLOURED FIBER CEMENT PRODUCTS AND METHODS FOR THE PRODUCTION THEREOF

FIELD OF THE INVENTION

The present invention relates to coloured fiber cement products as well as to methods for manufacturing such products. The present invention further relates to various uses of these coloured fiber cement products, in particular as building materials.

BACKGROUND OF THE INVENTION

Coloured fiber cement products are well known and widely used as building materials.

One way to provide coloured fiber cement products is to colour the products in the mass such that the internal structure of the fiber cement products comprises a coloured pigment. Mass-colouration of fiber cement products is typically achieved during the fiber cement product manufacturing process, for instance by adding a coloured pigment to the basic fiber cement slurry, which slurry is subsequently used for the production of the fiber cement end products.

However, a typically occurring undesirable phenomenon with fiber cement products, and especially with mass-coloured fiber cement products, under humid or outdoor conditions is efflorescence. Efflorescence is the tendency of salts that are present within the fiber cement structure to migrate to the surface of the fiber cement product. As a result, white spots become visible at the outer surface. While the efflorescence effect does not decrease or affect the mechanical properties of the fiber cement product, it is an undesirable visual defect which usually only occurs several months after production.

Especially in the case of mass-coloured products, efflorescence is a serious esthetic problem because of the high contrast between the colour of the product and the white efflorescence spots.

While occurring efflorescence can be reduced by e.g. physical or chemical treatment, it is a time-consuming and laborious procedure, which in addition has to be repeated every time efflorescence defects become visible again.

Some strategies, like prior hydrophobation of the outer surface of the product, have been suggested but, up to now, there is no efficient strategy to effectively manage this problem.

Moreover, in certain cases, and typically in the case of outdoor purpose products, one or more clear coating layers, i.e. typically comprising a binder with no pigments, are applied on the outer surface of coloured fiber cement products in order to protect these from potential damages, weathering and humidity. However, if efflorescence then occurs, the salts emerging at the surface of the fiber cement product during the efflorescence process become trapped underneath the clear coating layer, resulting in undesirable whitening of the surface colour. This defect can not be remedied without damaging the outer layer of the product.

Another way of providing coloured fiber cement products is to coat the products with a pigmented coating. European patent EP1914215 (by Applicant) describes such colour-coated fiber cement panels comprising a layer of pigmented conventional coating and on top thereof a radiation-cured clear coating.

A long known problem, however, with conventionally colour-coated products is that defects or damage, which regularly and almost inevitably occur during transport, installation and/or usage of these products, are immediately and clearly visible because of the high colour contrast between the coloured top coating and the internal structure of the fiber cement product.

There is thus a need for novel and improved coloured fiber cement products, which overcome the above-described problems.

SUMMARY OF THE INVENTION

An object of the present invention is to provide novel and improved coloured fiber cement products, as well as processes for the production thereof, which products do not suffer from the above described undesirable visible consequences of, on the one hand, efflorescence and, on the other hand, defects or damage caused by transportation, handling and/or long-term use.

In this regard, the present inventors have developed new and highly performant coloured fiber cement products, which are coloured in the mass and additionally are provided with one or more pigmented coating layers on their surface. The coloured fiber cement products of the present invention are characterized by (i) a fiber cement structure, which is uniformly pigmented (i.e. coloured in the mass), and (ii) one or more layers of a pigmented coating composition applied on (part of) their surface. In this way, the inventors have managed to solve the problems, which were long encountered with coloured fiber cement products in the past.

In particular, the inventors have found that the products of the invention can be produced with high efficiency and have the following advantages compared to the coloured fiber cement products of the prior art.

First of all, the visibility of any occurring defects or damage to the products of the present invention is minimized due to the fact that both the surface and the internal structure of the products is pigmented.

Furthermore, it was found that when the mass-coloured fiber cement products are coated with at least one pigmented coating layer, the typical visible defects caused by efflorescence are avoided. Moreover, the coating layer provides all the advantages of a typical coat finishing layer, i.e. optimal protection of the product from potential damages, weathering and humidity.

More particularly, the at least one pigmented coating layer of the coloured fiber cement products of the invention is characterized by a pigment volume concentration (PVC) of between about 1% and about 20%.

In certain instances, but however not necessarily, the coating composition on the surface of the fiber cement products of the invention and their internal fiber cement structure comprise the same pigment(s) or pigment(s) providing a similar colour.

When the at least one coating layer applied to the mass-coloured products of the invention is an opaque coating layer, ideally, the coating comprises an opaque pigment, which may be (but not necessarily should be) identical to at least one pigment contained in the mass of the fiber cement product so as to maintain the colour of the product after coating.

Alternatively and/or additionally, when the at least one coating layer applied to the mass-coloured products is a transparent coating, the coating may comprise at least one transparent pigment and/or at least one filler.

In the case where the coating composition is a transparent coating composition comprising at least one transparent pigment, the inventors have observed an additional advantage of the fiber cement products of the present invention. In particular, it was found that the colour of the mass pigmented product is significantly intensified and brightened when the coating composition comprises at least one transparent pigment. The invention thus in certain embodiments provides mass pigmented products having a deeper colour and a more bright, shiny appearance as compared to the same mass pigmented products not having such a transparent coating layer comprising at least one transparent pigment.

Accordingly, in view of the above, it is clear that the present invention provides coloured fiber cement products, which are both technically (no efflorescence defects) and esthetically (no colour change upon damage and/or more intense colour) improved.

In addition, to achieve the above described effects of the products of the invention, applying only one layer of an outer pigmented coating composition is already sufficient. This is in contrast with the prior art coloured fiber cement products, where it was necessary to at least apply two and preferably more layers of a coating composition to at least minimize the visible defects of potential future damage.

In a first aspect, the present invention provides coloured fiber cement products, which fiber cement products are coloured in the mass and at least comprise on at least part of their outer surface one or more cured layers of a coating composition at least comprising a binder and at least one pigment and/or at least one filler, wherein said coating composition is characterized by a pigment volume concentration (PVC) of between about 1% and 20%.

In particular embodiments, the present invention provides coloured fiber cement products, which fiber cement products are coloured in the mass and at least comprise on at least part of their outer surface one or more cured layers of a coating composition at least comprising a binder and at least one pigment, wherein said coating composition is characterized by a pigment volume concentration (PVC) of between about 1% and about 20%.

In further particular embodiments, the present invention provides coloured fiber cement products, which fiber cement products are coloured in the mass and at least comprise on at least part of their outer surface one or more cured layers of a coating composition at least comprising a binder and at least one filler, wherein said coating composition is characterized by a pigment volume concentration (PVC) of between about 1% and about 20%.

In yet further particular embodiments, the present invention provides coloured fiber cement products, which fiber cement products are coloured in the mass and at least comprise on at least part of their outer surface one or more cured layers of a coating composition at least comprising a binder, at least one pigment and at least one filler, wherein said coating composition is characterized by a pigment volume concentration (PVC) of between about 1% and about 20%.

In particular embodiments, the coating compositions present on the coloured fiber cement products of the present invention have a PVC of between about 1% and about 15%, such as a PVC of between about 2% and about 15%, such as a PVC of between about 5% and 15%, more particularly a PVC of between about 1% and 10%, such as a PVC of between about 2% and 10%, such as a PVC of between about 5% and 15%.

In particular embodiments, the binder in the coating composition provided on the outer surface of the fiber cement products according to the present invention is an acrylic polymer. In further particular embodiments, the acrylic polymer is chosen from the group consisting of pure acrylic, styrene acrylic, siloxane acrylic, epoxy acrylic, polyester acrylic, polyuria acrylic and urethane acrylic.

In particular embodiments, the at least one pigment in the coating composition provided on the outer surface of the coloured fiber cement products according to the present invention comprises at least one inorganic pigment.

In particular embodiments, the at least one pigment in the coating composition provided on the outer surface of the coloured fiber cement products according to the present invention is the same as at least one pigment comprised in the mass of the coloured fiber cement products.

In particular embodiments, the at least one pigment in the coating composition provided on the outer surface of the coloured fiber cement products according to the present invention is a transparent pigment.

In particular embodiments, the at least one pigment in the coating composition provided on the outer surface of the coloured fiber cement products according to the present invention is an iron oxide pigment.

In particular embodiments, the at least one pigment in the coating composition provided on the outer surface of the coloured fiber cement products according to the present invention comprises at least two different pigments.

In a second aspect, the present invention provides processes for producing colour-coated fiber cement products that are coloured in the mass, said processes at least comprising the steps of:
  providing a fiber cement product that is coloured in the mass,
  applying to at least part of the outer surface of the coloured fiber cement product one or more layers of a coating composition at least comprising a binder and a pigment and/or a filler and is characterized by a pigment volume concentration (PVC) of between about 1% and 20%, and
  curing the one or more layers of the coating composition so as to obtain a coated fiber cement product that is coloured in the mass.

In particular embodiments, in these processes for producing coloured fiber cement products, a coating composition is used, which is characterized by a pigment volume concentration (PVC) of between about 1% and about 15%, such as a PVC of between about 2% and about 15%, such as a PVC of between about 5% and 15%, more particularly a PVC of between about 1% and 10%, such as a PVC of between about 2% and 10%, such as a PVC of between about 5% and 10%.

In further particular embodiments, in these processes for producing coloured fiber cement products, the binder present in the coating composition is an acrylic polymer. In further particular embodiments, the acrylic polymer is chosen from the group consisting of pure acrylic, styrene acrylic, siloxane acrylic, epoxy acrylic, polyester acrylic, polyuria acrylic and urethane acrylic.

In a third aspect, the present invention provides uses of the coloured fiber cement products as building materials. In particular embodiments, the fiber cement products produced by the processes of the present invention can be used to provide an outer surface to walls, both internal as well as external, a building or construction, e.g. as façade plate, siding, etc.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DESCRIPTION OF ILLUSTRATIVE EMBODIMENTS

The present invention will be described with respect to particular embodiments.

It is to be noted that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

The following terms are provided solely to aid in the understanding of the invention.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The terms "(fiber) cementitious slurry" or "(fiber) cement slurry" as referred to herein generally refer to slurries at least comprising water, fibers and cement. The fiber cement slurry as used in the context of the present invention may also further comprise other components, such as but not limited to, limestone, chalk, quick lime, slaked or hydrated lime, ground sand, silica sand flour, quartz flour, amorphous silica, condensed silica fume, microsilica, metakaolin, wollastonite, mica, perlite, vermiculite, aluminum hydroxide, pigments, anti-foaming agents, flocculants, and other additives.

"Fiber(s)" present in the fiber cement slurry as described herein may be for example process fibers and/or reinforcing fibers which both may be organic fibers (typically cellulose fibers) or synthetic fibers (polyvinylalcohol, polyacrilonitrile, polypropylene, polyamide, polyester, polycarbonate, etc.).

"Cement" present in the fiber cement slurry as described herein may be for example but is not limited to Portland cement, cement with high alumina content, Portland cement of iron, trass-cement, slag cement, plaster, calcium silicates formed by autoclave treatment and combinations of particular binders. In more particular embodiments, cement in the products of the invention is Portland cement.

The term "water-permeable" as used herein when referring to a water-permeable (region of a) transport belt generally means that the material of which the water-permeable (region of the) belt is made allows water to flow through its structure to a certain extent.

The "water-permeability" as used herein when referring to the water-permeability of a (region of a) transport belt generally refers to the extent or degree to which the material of which the water-permeable (region of the) belt is made, allows water to flow through its structure. Suitable materials for water-permeable transport belts are known to the person skilled in the art, such as but not limited to felts.

The terms "predetermined" and "predefined" as used herein when referring to one or more parameters or properties generally mean that the desired value(s) of these parameters or properties have been determined or defined beforehand, i.e. prior to the start of the process for producing the products that are characterized by one or more of these parameters or properties.

A "(fiber cement) sheet" as used herein, also referred to as a panel or a plate, is to be understood as a flat, usually rectangular element, a fiber cement panel or fiber cement sheet being provided out of fiber cement material. The panel or sheet has two main faces or surfaces, being the surfaces with the largest surface area. The sheet can be used to provide an outer surface to walls, both internal as well as external a building or construction, e.g. as façade plate, siding, etc.

The properties of a coating are governed by, amongst others, the loading of the system with solid particles. Some coatings contain a high amount of solid particles and other coatings, like clear coats, are free of particles. Particle loading is quantified by the "Pigment Volume Concentration" (PVC) of the coating system. The PVC of a system is defined as the volume percentage of solid particles in the coating system after film formation:

"Pigment volume concentration" (expressed in %)="PVC" (expressed in %)=$(Vp+Vf)/(Vp+Vf+Vb)*100$ (expressed in %), wherein Vp : total volume of all pigments in the coating system.
Vf : total volume of all fillers in the coating system.
Vb : volume of the non-volatile part of the binders in the coating system.

This definition implies that the PVC of a system is calculated by leaving the volatile components, like water and solvents, out. The volumes of the non-volatile components should be used, implying that the weights of the solids must be transferred into volumes by using the density of each of the components.

The term "UV-curable" refers to a composition that can polymerize upon application of UV irradiation. Typically, this at least implies the presence of photo-polymerizable monomers or oligomers, together with photoinitiators and/or photosensitizers.

The terms "mass-coloured", "coloured in the mass", "through-coloured" when referring to a fiber cement product has the meaning that at least part of the, and preferably the entire, internal structure of that fiber cement product comprises at least one pigment.

The term "hiding power" as used herein is the property of a coating which enables it to hide the surface over which it is applied. The hiding power is directly linked to the film application method and the film thickness. In a coating with strong hiding power, the pigment particles scatter the light so strongly that it hardly reaches the substrate. If residual light is reflected from the substrate, it is so strongly scattered that it does not reach the eye. There are a number of standard test methods available. For instance, BS 3900-D4 (i.e. also referred to as ISO 2814), BS 3900-D7 (i.e. also referred to as ISO 6504/1) or BS 3900-D11 (also referred to as ISO 6504/3) are standard method for determining the hiding power of coatings.

The terms "internal (fiber cement) structure", "inner (fiber cement) structure", "internal (fiber cement) mass" or "inner (fiber cement) mass" as referred to interchangeably herein are used to indicate the fiber cement material present in a fiber cement product, which material is not visible with the eye when looking at the product from the outside.

The terms "external (fiber cement) structure" or "external (fiber cement) surface" as referred to interchangeably herein are used to indicate the fiber cement material which is exposed and visible on the outside of a fiber cement product.

The term "coloured fiber cement products" as used herein is meant to indicate fiber cement products that are coloured in the mass (as defined herein) and/or colour-coated with one or more pigmented coating layers.

A "transparent coating composition" as referred to herein is used to indicate a coating formulation or composition having the property of transmitting rays of light through its substance so that surfaces or objects, which are situated beyond or behind the coating, such as surfaces or objects coated by such transparent coating, are distinctly visible. A transparent coating composition as defined and used herein may or may not comprise one or more pigments, as long as it remains its inherent property of transmitting rays of light through its substance so that surfaces or objects, which are situated beyond or behind the coating, such as surfaces or objects coated by such transparent coating, are distinctly visible.

A "clear coat" or a "clear coating composition" as referred to herein is used to indicate a coating formulation or composition without (i.e. not containing any) pigments and having the property of transmitting rays of light through its substance so that surfaces or objects, which are situated beyond or behind the coating, such as surfaces or objects coated by such transparent coating, are distinctly visible.

A "transparent pigment" as used herein is meant to indicate a pigment of which the pigment particles have the property of transmitting visible light. Thus, a "transparent pigment" as used herein is a pigment, of which the majority of pigment particles are smaller than the wave length of visible light.

An "opaque pigment" as used herein is meant to indicate a pigment of which the pigment particles do not have the property of transmitting visible light. Thus, an "opaque pigment" as used herein is a pigment of which the majority of pigment particles are greater than the wave length of visible light.

A "semi-opaque pigment" (also referred to in the art as a semi-transparent pigment) as used herein is meant to indicate a pigment of which only a certain but significant percentage of pigment particles have the property of transmitting visible light. Thus, a "semi-opaque pigment" as used herein is a pigment of which a certain but significant percentage of pigment particles are greater than the wave length of visible light and of which the remaining percentage of pigment particles are smaller than the wave length of visible light.

The invention will now be further explained in detail with reference to various embodiments. It will be understood that each embodiment is provided by way of example and is in no way limiting to the scope of the invention. In this respect, it will be clear to those skilled in the art that various modifications and variations can be made to the present invention without departing from the scope or spirit of the invention. For instance, features illustrated or described as part of one embodiment, can be used in another embodiment to yield a still further embodiment. Thus, it is intended that the present invention covers such modifications and variations as encompassed within the scope of the appended claims and equivalents thereof.

The present invention provides coloured fiber cement products having improved properties with regard to the capability of being suitable for outdoor without suffering from the undesirable visible consequences of efflorescence and/or potential defects and damage.

In particular, it was found that by coating mass-coloured fiber cement products with a coating composition, wherein the amount of solid particles (e.g. pigments and fillers) versus the total amount of solids (e.g. pigments, fillers and solid binder components) in the coating composition (i.e. the so-called "pigment volume concentration" (PVC) of the coating composition) is between about 1% and about 20% such that the visible defects of efflorescence that may occur under outdoor (i.e. high humidity) conditions are avoided. In addition, since the products of the invention are both pigment-coated and mass-coloured, the visible consequences of any defects occurring due to transportation, handling and long-term use are minimized.

In certain particular embodiments, when the coating applied to the mass-coloured products is an opaque coating, it comprises an opaque pigment, which is identical to at least one pigment contained in the mass of the fiber cement product so as to maintain the colour of the product after coating.

In certain alternative particular embodiments, when the coating applied to the mass-coloured products is a transparent coating, the coating composition may comprise at least one transparent pigment and/or at least one filler.

In the case where the coating composition is a transparent coating composition comprising at least one transparent pigment, the inventors have observed that the colour of the mass pigmented product is significantly intensified and brightened. The invention thus in certain embodiments provides mass pigmented products having a deeper colour and a more bright, shiny appearance as compared to the same mass pigmented products not having such a transparent coating layer comprising at least one transparent pigment.

Accordingly, in view of the above, it is clear that the present invention provides fiber cement products, which are both technically (no efflorescence defects) and esthetically (no colour change upon damage and/or more intense colour) improved.

Accordingly, the coloured fiber cement products according to the present invention are characterized by comprising a coating layer with a PVC of between about 1% and about 20%, thereby achieving the effect of preventing undesirable efflorescence effects.

Thus, in a first aspect, the present invention provides coloured fiber cement products, which fiber cement products are coloured in the mass, and at least comprise on at least part of their outer surface one or more cured layers of a coating composition, which composition at least comprises a binder and a pigment and is characterized by a pigment volume concentration (PVC) of between about 1% and about 20%.

In the context of the present invention, fiber cement products are to be understood as cementitious products comprising cement and synthetic (and optionally natural) fibers. The fiber cement products are made out of fiber cement slurry, which is formed in a so-called "green" fiber cement product, and then cured.

Dependent to some extent on the curing process used, the fiber cement slurry typically comprises water, process or reinforcing fibers which are synthetic organic fibers (and optionally also natural organic fibers, such as cellulose), cement (e.g. Portland cement), limestone, chalk, quick lime, slaked or hydrated lime, ground sand, silica sand flour, quartz flour, amorphous silica, condensed silica fume, microsilica, kaolin, metakaolin, wollastonite, mica, perlite, vermiculite, aluminum hydroxide (ATH), pigments, antifoaming agents, flocculants, and/or other additives.

Fiber cement products that are so-called "coloured in the mass" are products comprising in at least part of their fiber cement structure (i.e. internal fiber cement structure and/or externally exposed and visible fiber cement surface), and preferably but not necessarily throughout their entire fiber cement structure (i.e. internal fiber cement structure and externally exposed and visible fiber cement surface), at least one pigment, such as preferably an opaque or a semi-opaque pigment. Thus, in particular embodiments, "(mass-)coloured fiber cement products" or "fiber cement products coloured in the mass" as referred to interchangeably herein can comprise one or more internal fiber cement layers that comprise at least one pigment while other internal fiber cement layers do not. However, in alternative particular embodiments, "(mass-)coloured fiber cement products" or "fiber cement products coloured in the mass" as referred to interchangeably herein may comprise at least one pigment, which is preferably an opaque pigment or a semi-opaque pigment, throughout their entire mass or structure (i.e. comprising internal fiber cement structure and externally exposed and visible fiber cement surface).

In particular embodiments, the fiber cement products of the invention have a thickness of between about 4 mm and about 200 mm, in particular between about 6 mm and about 200 mm, more in particular between about 8 mm and about 200 mm, most in particular between about 10 mm and about 200 mm.

The coloured fiber cement products as referred to herein include roof or wall covering products made out of fiber cement, such as fiber cement sidings, fiber cement boards, flat fiber cement sheets, corrugated fiber cement sheets and the like. According to particular embodiments, the fiber cement products according to the invention can be roofing or façade elements, flat sheets or corrugated sheets. According to further particular embodiments, the fiber cement products of the present invention are fiber cement sheets.

The fiber cement products of the present invention comprise from about 0.1 to about 5 weight %, such as particularly from about 0.5 to about 4 weight % of fibers, such as more particularly between about 1 to 3 weight % of fibers with respect to the total weight of the fiber cement product.

According to particular embodiments, the fiber cement products according to the invention are characterized in that it comprises fibers chosen from the group consisting of cellulose fibers or other inorganic or organic reinforcing fibers in a weight % of about 0.1 to about 5. In particular embodiments, organic fibers are selected from the group consisting of polypropylene, polyvinylalcohol polyacrylonitrile fibers, polyethyelene, cellulose fibres (such as wood or annual kraft pulps), polyamide fibers, polyester fibers, aramide fibers and carbon fibers. In further particular embodiments, inorganic fibers are selected from the group consisting of glass fibers, rockwool fibers, slag wool fibers, wollastonite fibers, ceramic fibers and the like. In further particular embodiments, the fiber cement products of the present invention may comprise fibrils fibrids, such as for example but not limited to, polyolefinic fibrils fibrids % in a weight % of about 0.1 to 3, such as "synthetic wood pulp".

According to certain particular embodiments, the fiber cement products of the present invention comprise 20 to 95 weight % cement as hydraulic binder. Cement in the products of the invention is selected from the group consisting of Portland cement, cement with high alumina content, Portland cement of iron, trass-cement, slag cement, plaster, calcium silicates formed by autoclave treatment and combinations of particular binders. In more particular embodiments, cement in the products of the invention is Portland cement.

According to particular embodiments, the fiber cement products according to the invention optionally comprise further components. These further components in the fiber cement products of the present invention may be selected from the group consisting of water, sand, silica sand flour, condensed silica fume, microsilica, fly-ashes, amorphous silica, ground quartz, the ground rock, clays, pigments, kaolin, metakaolin, blast furnace slag, carbonates, puzzolanas, aluminium hydroxide, wollastonite, mica, perlite, calcium carbonate, and other additives (e.g. colouring additives) etc. It will be understood that each of these components is present in suitable amounts, which depend on the type of the specific fiber cement product and can be determined by the person skilled in the art.

In particular embodiments, the total quantity of such further components is preferably lower than 70 weight % compared to the total initial dry weight of the composition.

Further additives that may be present in the fiber cement products of the present invention may be selected from the group consisting of dispersants, plasticizers, antifoam agents and flocculants. The total quantity of additives is preferably between about 0.1 and about 1 weight % compared to the total initial dry weight of the composition.

The coating composition provided on the surface of the coloured fiber cement products of the invention at least comprises a (i.e. at least one) binder and a (i.e. at least one) pigment and/or a (i.e. at least one) filler.

Accordingly, in particular embodiments, the present invention provides coloured fiber cement products, which fiber cement products are coloured in the mass, and at least comprise on at least part of their outer surface one or more cured layers of a coating composition at least comprising a binder and at least one pigment, wherein said coating composition is characterized by a pigment volume concentration (PVC) of between about 1% and about 20%.

In further particular embodiments, the present invention provides coloured fiber cement products, which fiber cement products are coloured in the mass and at least comprise on at least part of their outer surface one or more cured layers of a coating composition at least comprising a binder and at least one filler, wherein said coating composition is characterized by a pigment volume concentration (PVC) of between about 1% and about 20%.

In yet further particular embodiments, the present invention provides coloured fiber cement products, which fiber cement products are coloured in the mass, and at least comprise on at least part of their outer surface one or more cured layers of a coating composition at least comprising a binder, at least one pigment and at least one filler, wherein said coating composition is characterized by a pigment volume concentration (PVC) of between about 1% and about 20%.

Binders, pigments and fillers suitable for use in the coating compositions of the present invention are known in the art and are not critical to the invention as long as the coatings are characterized by a pigment volume concentration (PVC; as defined herein) of between about 1% and about 20%.

In particular embodiments, at least one of the one or more layers of the coating composition provided on the surface of the fiber cement products of the invention is not curable by radiation or by chemical crosslinking.

In such embodiments, suitable binder compositions for use as a coating layer in the products of the present invention are for example binders obtained by aqueous free radical or ionic emulsion polymerization. For instance, suitable binders for use as a coating layer in the products of the present invention are acrylic and/or methacrylic (co-) polymers. Such acrylic and/or methacrylic (co-) polymers are usually prepared by aqueous radically initiated emulsion polymerization of esters of acrylic acid and/or methacrylic acid with C1-C12 alkanols as well as a minor amount of acrylic and/or methacrylic acid as monomers. In this regard, preference is given in particular to esters of acrylic and methacrylic acid with C1-C8 alkanols.

Thus, in particular embodiments, the binding polymer may be provided as a pure acrylic, a styrene acrylic, a fluoropolymer acrylic, a urethane acrylic, a vinyl acrylic and/or an acrylated ethylene vinyl acetate copolymer or combinations thereof. The polymer may be derived from at least one acrylic monomer, such as an acrylic acid, acrylic acid ester, methacrylic acid, and methacrylic acid ester. Typically, the binding polymer is derived from one or more monomers, examples of which include polyvinylidine fluoride, styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4-C8 conjugated dienes.

In certain particular embodiments, the binding polymer of the coating composition of the products of the invention is selected for degree of hydrophobicity and/or particle size. Polymeric particles for compositions described herein are typically in the nanometer size range, while polymeric particles in other conventional paint formulations range in size from 50 to 250 nanometers.

The binder of polymeric particles is typically provided at a weight percent (wt %) of less than 60%, preferably at a range at or about 20-55% for a water-based coating provided herein.

In certain particular embodiments, at least one of the one or more layers of the coating composition provided on the surface of the fiber cement products of the invention is curable by radiation or by chemical crosslinking.

In such embodiments, a radiation-curable coating composition is applied on top of the fiber cement surface. Such a radiation-curable coating composition comprises at least one polymer having ethylenically unsaturated double bonds, which is radiation curable. Possible polymers for the radiation-curable coating compositions are in principle any polymer which has ethylenically unsaturated double bonds and which can undergo radical-initiated polymerization on exposure to UV radiation or electron beam radiation.

The monomers having unsaturated double bonds such as acryl amide monomers, meth acrylic acid monomers, (meth) acrylic acid monomers, N-vinyl pyrrolidone and crotonic acid are preferred to be the polymerizable monomer.

Care should be taken here that the content of ethylenically unsaturated double bonds in the polymer is sufficient to ensure effective crosslinking. The content of ethylenically unsaturated double bonds in the is generally in the range from about 0.01 to about 1.0 mol/100 g of polymer, more preferably from about 0.05 to about 0.8 mol/100 g of polymer and most preferably from about 0.1 to about 0.6 mol/100 g of polymer. Suitable polymers are for example but not limited to polyurethane derivatives which contain ethylenically unsaturated double bonds, such as polyurethane acrylates.

Besides the polymer, the radiation-curable coating composition may also contain a different compound having a molecular weight of less than about 800 g/mol and capable of polymerization by cationic or free-radical pathways. These compounds have generally at least one ethylenically unsaturated double bond and/or one epoxy group and a molecular weight being less than about 800 g/mol. Such compounds generally serve to adjust to the desired working consistency of the radiation-curable preparations. This is particularly important if the preparation contains no other diluents, such as water and/or inert organic solvents, or contains these only to a subordinate extent. Such compounds are therefore also termed reactive diluents. The proportion of reactive diluents, based on the total amount of polymer and the reactive diluent in the radiation-curable preparation, is preferably in the range of about 0% to about 90% by weight, and most preferably in the range from about 5% to about 50% by weight. Preferred reactive diluents are the esterification products of di- or polyhydric alcohols with acrylic and/or methacrylic acid. Such compounds are generally termed polyacrylates or polyether acrylates. Hexanediol diacrylate, tripropylene glycol diacrylate and trimethylolpropane triacrylate are particularly preferred.

Radiation-curable coating compositions may also comprise polymers which have cationically polymerizable groups, in particular epoxy groups. These include copolymers of ethylenically unsaturated monomers, the copolymers containing, as comonomers, ethylenically unsaturated glycidyl ethers and/or glycidyl esters of ethylenically unsaturated carboxylic acids. They also include the glycidyl ethers of OH-group-containing polymers, such as OH-group-containing polyethers, polyesters, polyurethanes and novolacs. They include moreover the glycidyl esters of polymers containing carboxylic acid groups. If it is desired to have a cationically polymerizable component, the compositions may comprise, instead of or together with the cationically polymerizable polymers, a low-molecular-weight, cationically polymerizable compound, for example a di- or polyglycidyl ether of a low-molecular-weight di- or polyol or the di- or polyester of a low-molecular-weight di- or polycarboxylic acid.

The radiation-curable compositions comprise usual auxiliaries, such as thickeners, flow control agents, defoamers, UV stabilizers, emulsifiers, surface tension reducers and/or protective colloids. Suitable auxiliaries are well known to the person skilled in the coatings technology. Silicones, particularly polyether modified polydimethylsiloxane copolymers, may be used as surface additives to provide good substrate wetting and good anti-crater performance by reduction of surface tension of the coatings. Suitable stabilizers encompass typical UV absorbers, such as oxanilides, triazines, benzotriazoles (obtainable as Tinuvin™ grades from Ciba Geigy) and benzophenones. These may be used in combination with usual free-radical scavengers, for example sterically hindered amines, e.g. 2,2,6,6-tetramethylpiperidine and 2,6-di-tert-butylpiperidine (HALS compounds). Stabilizers are usually used in amounts of from about 0.1% to about 5.0% by weight and preferably from about 0.3% to about 2.5% by weight, based on the polymerizable components present in the preparation.

In further particular embodiments, the coated fiber cement products of the present invention, which are mass-coloured, may comprise a coloured first coating layer, which is not radiation-curable (such as the acrylic-based coatings described herein), and additionally (on top thereof) a transparent radiation curable coating layer (such as the radiation curable coatings described herein), comprising either no pigments (i.e. in case of a clear coating) or one or more transparent pigments.

Apart from a binder, the coating compositions provided on the surface of the coated fiber cement products of the invention may comprise one or more pigments.

The one or more pigments may be opaque pigments, semi-opaque pigments and/or transparent pigments or a combination thereof.

Pigments provide color, hiding, and/or are present as extenders. Pigments include those in the form of titanium oxide, iron oxides, calcium carbonate, spinell pigments, titanates, clay, aluminum oxide, silicon dioxide, magnesium oxide, magnesium silicate, barium metaborate monohydrate, sodium oxide, potassium oxide, talc, barytes, zinc oxide, zinc sulfite and mixtures thereof or organic alkaliresistant pigments such as phtalocyanines and azo compounds.

In particular embodiments, when the pigments in the coating composition are opaque or semi-opaque, these pigments are identical to or these pigments provide a similar colour as at least one of the pigments present in the structure of the mass-coloured fiber cement products, so as to ensure that both the fiber cement product and the coating composition have the same or a similar colour.

In particular embodiments, when the pigments in the coating composition are transparent pigments, the at least one transparent pigment is present as an extender pigment (also called "extender").

Transparent pigments that are suitable for use in the transparent coating compositions of the coated fiber cement products of the invention are for instance but not limited to transparent iron oxides or transparent titanium oxides (the latter optionally used with accelerators).

In particular embodiments of the present invention, the pigments suitable for use in the first coating composition in the processes and products of the present invention are essentially alkali-resistant, i.e. resistant to a pH of about 8 or higher, such as resistant to a pH of about 9 or higher, such as resistant to a pH of about 10 or higher, such as resistant to a pH of about 11 or higher, more particularly resistant to a pH of higher than about 12 or higher than about 13.

Examples of suitable fillers are silicates, barium sulphates, alkaline-earth metal carbonates, preferably calcium carbonate in the form of calcite or lime, dolomite, and also aluminum silicates or magnesium silicates, e.g. talc, alumina hydrate (sometimes called simply "hydrate"), magnesium carbonate (sometimes called simply "magnesia"), blanc fixe, barytes, and clays.

The coating composition used for providing the coating layer directly onto the surface of the fiber cement products of the invention further comprises, besides the polymeric binders and pigments and/or fillers, also usual auxiliaries, e.g. coalescing agents, anti-blistering agents, rheology modifiers, surfactants, wetting agents, viscosity modifiers, dispersants, defoamers, preservatives and hydrophobisizers, biocides, fibers, colorants, waxes, perfumes and co-solvents and other usual constituents.

Accordingly, the coating composition used for providing the first coating layer on the surface of the fiber cement products of the invention further may comprise one or more film-forming aids or coalescing agents. Suitable firm-forming aids or coalescing agents include glycol ethers (e.g., products from Eastman Chemical Company, Kingsport, Tenn., including DB, EB, PM, EP) and ester alcohols (e.g., products from Eastman Chemical Company, Kingsport, Tenn., including Texanol), as examples.

In addition to the above, the coating composition used for providing the first coating layer on the surface of the fiber cement products of the invention further may comprise one or more additives included for properties, such as regulating flow and leveling, sheen, foaming, yellowing, resistance to stains, cleaner, burnish, block, mildew, dirt, or corrosion, and for retaining color and gloss.

The emulsion polymerization of the coating composition requires the use of surfactants as stabilizers. Non-ionic surfactants are preferred. Alcohol ethoxylates are particularly preferred. Conventional coatings with a hydroxyl number (measured according to ISO 4629) of at least 1 are preferred. Hydroxyl numbers of at least 1.5 are particularly preferred.

Examples of suitable surface-active dispersing or wetting agents include those available under the trade designations, such as STRODEX™ KK-95H, STRODEX™ PLF100, STRODEX™ PKOVOC, STRODEX™ LFK LFK70, STRODEX™ SEK50D, and DEXTROL® OC50 (trademarks of Dexter Chemical LLC, Wilmington, Del.); HYDROPALAT™ 100, HYDROPALAT™ 140, HYDROPALAT™ 44, HYDROPALAT™ 5040 and HYDROPALAT™ 3204 (trademarks of Cognis Corp., Monheim, Germany); LIPOLIN™ A, DISPERS™ 660C, DISPERS™ 715W (trademarks of Evonik Degussa GmbH, Germany); BYK® 156, BYK® 2001 and ANTI-TERRA™ 207 (trademarks of Byk-Cera, Germany); DISPEX™ A40, DISPEX™ N40, DISPEX™ R50, DISPEX™ G40, DISPEX™ GA40, EFKA® 1500, EFKA® 1501, EFKA® 1502, EFKA® 1503, EPKA™ 3034, EFKA® 3522, EFKA® 3580, EFKA™ 3772, EFKA® 4500, EFKA® 4510, EFKA® 4520, EFKA® 4530, EFKA® 4540, EFKA® 4550, EFKA® 4560, EFKA® 4570, EFKA® 6220, EFKA® 6225, EFKA® 6230 and EFKA® 6525 (trademarks of Ciba Specialty Chemicals, Basil, Switzerland); SURFYNOL™ CT-111, SURFYNOL™ CT-121, SURFYNOL™ CT-131, SURFYNOL™ CT-211, SURFYNOL™ CT 231, SURFYNOL™ CT-136, SURFYNOL™ CT-151, SURFYNOL™ CT-171, SURFYNOL™ CT-234, CARBOWET™ DC-01, SYRFYNOL™ 104, SURFYNOL™ PSA-336, SURFY- NOL™ 420, SURFYNOL™ 440, ENVIROGEM™ AD-01 and ENVIROGEM™ AE01 (trademarks of Air Products and Chemicals, Inc., Lehigh Valley, Pa.); TAMOL™ 1124, TAMOL™ 165A, TAMO™ 850, TAMOL™ 681, TAMOL™ 731 and TAMOL™ SG-1 (trademarks of Rohm & Haas Company, Philadelphia, Pa.); IGEPAL™ CO-210, IGEPAL™ CO-430, IGEPAL™ CO-630, IGEPAL™ CO-730, and IGEPAL™ CO-890 (trademarks of Rhodia Inc., Cranbury, N.J.); T-DET™ and T-MULZ™ (trademarks of Harcros Chemicals Inc., Kansas City, Kans.).

Examples of suitable defoamers include but are not limited to BYK™ 018, BYK® 019, BYK® 020, BYK® 022, BYK® 025, BYK® 032, BYK® 033, BYK® 034, BYK® 038, BYK® 040, BYK® 060, BYK® 070 and BYK® 077 (trademarks of Byk-Cera, Germany); SURFYNOL™ DF-695, SURFYNOL™ DF-75, SURFYNOL™ DF-62, SURFYNOL™ DF-40 and SURPYNOL™ DF-110D (trademarks of Air Products and Chemicals, Inc., Lehigh Valley, Pa.); DEE FO® 3010A, DEE FO® 2020E/50, DEE FO® 215, DEE FO® 806-102 and AGITAN™ 31BP, AGITAN™ 731 (trademarks of Munzing Chemie GmbH, Germany); EFKA® 2526, EFKA® 2527 and EFKA® 2550 (trademarks of Ciba Specialty Chemicals, Basil, Switzerland); TEGO® Foamex 8050, TEGO® Foamex 1488, TEGO® Foamex 7447, TEGO® Foamex 800, TEGO® Foamex 1495 and TEGO® Foamex 810 (trademarks of Evonik Degussa GmbH, Germany); FOAMASTER® 714, FOAMASTER® A410, FOAMASTER® 111, FOAMASTER® 333, FOAMASTER® 306, FOAMASTER® SA-3, FOAMASTER® AP, DEHYDRAN® 1620, DEHYDRAN® 1923 and DEHYDRAN® 671 (trademarks of Cognis Corp., Monheim, Germany).

A thickener and rheology modifier is included for improving spreading, handling, and application of the coating composition, when desired. Preferably, the thickener is a non-cellulosic thickener due to preferred non moisture swelling characteristics. Associative thickeners such as, for example, hydrophobically modified alkali swellable acrylic copolymers and hydrophobically modified urethane copolymers generally impart more Newtonian rheology to emulsion paints compared to conventional thickeners such as, for example, cellulosic thickeners. Cellulosic thickeners perform by swelling in water and are undesirable in several preferred embodiments as further described herein. Representative examples of suitable associative thickeners used herein include Acrysol™ RM 8W and Acrysol™ RM-2020 NPR (trademarks of Rohm & Haas Company, Philadelphia, Pa.).

Coating compositions used for providing the coating layer on the surface of the coloured fiber cement products of the invention further may also comprise other additives, such as plasticizer, anti-foam agent, pH adjuster (amine or ammonia), tinting color, and biocide. Such coating additives are typically present in the formulation in an amount from about 0 to about 18% by weight or up to 18 by weight and from about 1 to about 15% by weight based on the total weight of the formulation.

In addition, coating compositions used for providing the coating layer on the surface of the fiber cement products of the invention may include one or more functional extenders to increase coverage, reduce cost, achieve durability, alter appearance, control rheology, and/or influence other desirable properties. Examples of functional extenders include, for example, barium sulphate, aluminum silicate, magnesium silicate, barium sulphate, calcium carbonate, clay, gypsum, silica, and talc.

In several embodiments, it will be desirable to include a biocide or mildewicide, or fungicide to the coating compositions used for providing the first coating layer on the surface of the fiber cement products of the invention. Preferred examples include but are not limited to barium sulphate, ROZONE™ 2000, BUSAN™ 1292, BUSAN 11M1, BUSAN 11M2, and BUSAN 1440 (trademarks of Rohm & Haas Company, Philadelphia, Pa., or its subsidiaries or affiliates); POLYPHASE® 663 and POLYPHASE® 678 (trademark of Troy Chemical Corporation, Newark, N.J.); and KATHON™ LX (trademark of Rohm & Haas Company, Philadelphia, Pa., or its subsidiaries or affiliates.)

Coating compositions used for providing the coating layer on the surface of the fiber cement products of the invention are typically formulated to include at least about 50% by volume of dry solids. In particular embodiments, the balance of the coating compositions used for providing the first coating layer on the surface of the fiber cement products of the invention is water. Water is present with the binding polymer when provided in a dispersion and in other components of the coating compositions. Water is generally also added separately.

In particular embodiments, the coating compositions of the present invention have a PVC of between about 1% and about 15%, such as a PVC of between about 2% and about 15%, such as a PVC of between about 5% and 15%, more particularly a PVC of between about 1% and 10%, such as a PVC of between about 2% and 10%, such as a PVC of between about 5% and 15%.

In particular embodiments, the minimum film forming temperature during the drying of the one or more layers of the first coating composition of the fiber cement products suitable for being subjected to inkjet-printing is below about 60° C.

In further particular embodiments, these coating compositions used for providing the one or more coating layers on the surface of the fiber cement products of the invention comprises as liquid component essentially water and, if desired, an organic liquid miscible with water, for example an alcohol. The coating composition is applied as a wet coating weight in the range from about 30 to about 500 g/m$^2$, in particular from about 40 to about 300 g/m$^2$, more in particular from about 50 to about 500 g/m$^2$, in a known manner, for example by spraying, trowelling, knife application, brushing, rolling, curtain coating or pouring onto the cement bonded board, or by a combination of one or more applications. In particular embodiments, the coating composition is preferably applied by spraying.

Thus, the coating compositions described herein can be applied to a surface of a fiber cement product using a brush, blade, roller, sprayer (e.g., air-assisted or airless, electrostatic), vacuum coater, curtain coater, flood coater or any suitable device that promotes an even distribution of the coating composition over the surface, even if the surface is damaged, worn, or cracked. The coating compositions may be applied to provide a smooth surface, colored surface or textured surface. A portion or an entire surface of the fiber cement product may be coated at one time. In addition or as an alternative, all or a portion of the surface may be coated more than one time to achieve the desired thickness, gloss, and/or surface effect. The amount of coverage obtained by a quantity of the composition will vary depending on the desire and/or condition of the surface to be covered and the thickness of the coating applied.

In a second aspect, the present invention provides processes for producing coloured fiber cement products that are coloured in the mass and coated with a pigmented coating composition.

These processes of the invention at least comprise the first step of providing a fiber cement product that is coloured in the mass (as defined herein).

A first step in these methods of the invention is providing a fiber cement product, which can be performed according to any method known in the art for preparing fiber cement products, essentially consisting of at least water, cement and fibers.

In this step, a fiber cement slurry can first be prepared by one or more sources of at least cement, water and fibers. In certain specific embodiments, these one or more sources of at least cement, water and fibers are operatively connected to a continuous mixing device constructed so as to form a cementitious fiber cement slurry. In particular embodiments, when using cellulose fibers or the equivalent of waste paper fibers, a minimum of about 3%, such as about 4%, of the total slurry mass of these cellulose fibers is used. In further particular embodiments, when exclusively cellulose fibers are used, between about 4% to about 12%, such as more particularly, between about 7% and about 10%, of the total slurry mass of these cellulose fibers is used. If cellulose fibers are replaced by short mineral fibers such as rock wool, it is most advantageous to replace them in a proportion of 1.5 to 3 times the weight, in order to maintain approximately the same content per volume. In long and cut fibers, such as glass fiber rovings or synthetic high-module fibers, such as polypropylene, polyvinyl acetate, polycarbonate or acrylonitrile fibers the proportion can be lower than the proportion of the replaced cellulose fibers. The fineness of the fibers (measured in Shopper-Riegler degrees) is in principle not critical to the processes of the invention. Yet in particular embodiments, it has been found that a range between about 15 DEG SR and about 45 DEG SR can be particularly advantageous for the processes of the invention.

Once a fiber cement slurry is obtained, the manufacture of the fiber-reinforced cement products can be executed according to any known procedure. The process most widely used for manufacturing fiber cement products is the Hatschek process, which is performed using a modified sieve cylinder paper making machine. Other manufacturing processes include the Magnani process, injection, extrusion, flow-on and others. In particular embodiments, the fiber cement products of the present invention are provided by using the Hatschek process. The "green" or uncured fiber cement product is optionally post-compressed usually at pressures in the range from about 22 to about 30 MPa to obtain the desired density.

Methods for colouring fiber cement products in the mass are known to the person skilled in the art. This may for example (but not necessarily only) be achieved by adding pigments to the fiber cement slurry prior to the production of the fiber cement product and/or by applying (such as by spraying, pouring, or spattering) one or more layers of coating on top of one or more fiber cement layers (composing the eventual fiber cement end product) during a Hatschek or other (e.g. Magnani, flow-on) fiber cement process.

The processes according to the present invention may further comprise the step of cutting the fiber cement products to a predetermined length to form a fiber cement product. Cutting the fiber cement products to a predetermined length can be done by any technique known in the art, such as but not limited to water jet cutting, air jet cutting or the like. The fiber cement products can be cut to any desirable length, such as but not limited to a length of between about 1 m and about 15 m, such as between about 1 m and about 10 m, more particularly between about 1 m and about 5 m, most particularly between about 1 m and about 3 m.

It will be understood by the skilled person that the processes of the present invention may further comprise additional steps of processing the produced fiber cement products.

For instance, in certain particular embodiments, during the processes of the present invention, the fiber cement slurry and/or the fiber cement products may undergo various intermediate treatments, such as but not limited to treatment with one or more hydrophobic agents, treatment with one or more flocculants, additional or intermediate pressing steps, etc.

As soon as the fiber cement products are formed, these are trimmed at the lateral edges. The border strips can optionally be recycled through immediate mixing with the recycled water and directing the mixture to the mixing system again.

In particular embodiments, the obtained fiber cement products are cured. Indeed, after production, fiber cement products can be allowed to cure over a time in the environment in which they are formed, or alternatively can be subjected to a thermal cure (e.g. by autoclaving or the like). In further particular embodiments, the "green" fiber cement product is cured, typically by curing to the air (air cured fiber cement products) or under pressure in presence of steam and increased temperature (autoclave cured). For autoclave cured products, typically sand is added to the original fiber cement slurry. The autoclave curing in principle results in the presence of 11.3 Å (angstrom) Tobermorite in the fiber cement product.

In yet further particular embodiments, the "green" fiber cement product may be first pre-cured to the air, after which the pre-cured product is further air-cured until it has its final strength, or autoclave-cured using pressure and steam, to give the product its final properties.

In particular embodiments of the present invention, the processes may further comprise the step of thermally drying the obtained fiber cement products. After curing, the fiber cement product being a panel, sheet or plate, may still comprise a significant weight of water, present as humidity. This may be up to 10 even 15% w, expressed per weight of the dry product. The weight of dry product is defined as the weight of the product when the product is subjected to drying at 105° C. in a ventilated furnace, until a constant weight is obtained.

In certain embodiments, the fiber cement product is dried. Such drying is done preferably by air drying and is terminated when the weight percentage of humidity of the fiber cement product is less than or equal to 8 weight %, even less than or equal to 6 weight %, expressed per weight of dry product, and most preferably between 4 weight % and 6 weight %, inclusive.

A further step in the processes for the production of the coated mass-coloured fiber cement products is applying to at least part of the outer surface of the coloured fiber cement product one or more layers of a coating composition, which composition at least comprises a binder and a pigment and/or a filler and is characterized by a pigment volume concentration (PVC) of between about 1% and about 20%.

Coating compositions that can be used to coat the products of the invention are extensively described hereabove.

Finally, the processes for the production of mass-coloured fiber cement products that are coated with a coating composition comprise at least the further step of curing the one or more layers of the coating composition so as to obtain a coated fiber cement product that is coloured in the mass. In principle, any suitable curing step known in the art can be applied for film-forming, drying and hardening the one or more layers of the coating composition.

In particular embodiments, when the coating composition is not a radiation curable coating, it can be cured by drying at room temperature or preferably at elevated temperature, for example from 40 to 150° C. The dry thickness of such a conventional coating is generally from about 20 μm to about 100 μm, preferably from about 50 μm to about 70 μm.

In alternative particular embodiments, when the coating composition is a radiation curable coating, it is cured by radiation curing. Such radiation curing of the coating compositions may include curing by heat curing, dual-curing, UV curing, EB curing and other curing technologies within a thermoplastic or thermosetting system.

If curing is performed by UV radiation, the preparations to be used comprise at least one photoinitiator. A distinction is to be made here between photoinitiators for free-radical curing mechanisms (polymerization of ethylenically unsaturated double bonds) and photoinitiators for cationic curing mechanisms (cationic polymerization of ethylenically unsaturated double bonds or polymerization of compounds containing epoxy groups). Photoinitiators are not needed for electron beam curable compositions.

Suitable photoinitiators for free-radical photopolymerization, i.e. polymerization of ethylenically unsaturated double bonds, are benzophenone and benzophenone derivatives, such as 4-phenylbenzophenone and 4-chlorobenzophenone, Michler's ketone, anthrone, acetophenone derivatives, such as 1-benzoylcyclohexan-1-ol, 2-hydroxy-2,2-dimethylacetophenone and 2,2-dimethoxy-2-phenylacetophenone, benzoin and benzoin ethers, such as methyl benzoin ether, ethyl benzoin ether and butyl benzoin ether, benzil ketals, such as benzil dimethyl ketal, 2-methyl-1-[4-(methylthio) phenyl]-2-morpholinopropan-1-one, anthraquinone and its derivatives, such as .beta.-methylanthraquinone and tertbutylanthraquinone, acylphosphine oxides, such as 2,4,6-trimethylbenzoyldiphenylphosphine oxide, ethyl-2,4,6-trimethylbenzoylphenylphosphinate and bisacylphosphine oxides.

Suitable photoinitiators for cationic photopolymerization, i.e. the polymerization of vinyl compounds or compounds containing epoxy groups, are aryl diazonium salts, such as 4-methoxybenzenediazonium hexafluorophosphate, benzenediazonium tetrafluoroborate and toluenediazonium tetrafluoroarsenate, aryliodonium salts, such as diphenyliodonium hexafluoroarsenate, arylsulfonium salts, such as triphenylsulfonium hexafluorophosphate, benzene-and toluenesulfonium hexafluorophosphate and bis [4-diphenylsulfoniophenyl] sulfide bishexafluorophosphate, disulfones, such as diphenyl disulfone and phenyl-4-tolyl disulfone, diazodisulfones, imidotriflates, benzoin tosylates, isoquinolinium salts, such as N-ethoxyisoquinolinium hexafluorophosphate, phenylpyridinium salts, such as N-ethoxy-4-phenylpyridinium hexafluorophosphate, picolinium salts, such as N-ethoxy-2-picolinium hexafluorophosphate, ferrocenium salts, titanocenes and titanocenium salts.

The abovementioned photoinitiators are used, in amounts from about 0.05% to about 20% by weight, preferably from about 0.1% to about 10% by weight and in particular from about 0.1% to about 5% by weight, based on the polymerizable components of the radiation-curable composition.

The radiation-curable coating composition may be cured by exposure to a UV radiation of wavelength generally from about 200 nm to about 600 nm. Suitable examples of UV sources are high and medium pressure mercury, iron, gallium or lead vapor lamps. Medium pressure mercury vapor lamps are particularly preferred, e.g. the CK or CK1 sources from the company IST (Institut fur Strahlungstechnologie). The radiation dose usually sufficient for crosslinking is in the range from about 80 to about 3000 mJ/cm2. Any solvent present, in particular water, is dried out before the curing in a separate drying step preceding curing, for example by heating to temperatures in the range from about 40° C. to about 80° C., or by exposure to IR radiation.

In case of electron beam curing, irradiation is performed with high-energy electrons (usually from 100 to 350 keV), by applying a high voltage to tungsten filaments inside a vacuum chamber), and the actual curing step takes place in an inert, oxygen-free atmosphere.

The radiation-curable coating compositions as used in the products and processes of the present invention described herein are applied to at least part of the outer surface of a fiber cement product using a brush, blade, roller, sprayer (e.g., air-assisted or airless, electrostatic), vacuum coater, curtain coater, flood coater or any suitable device that promotes an even distribution of the paint formulation over the surface, even if the surface is damaged, worn, or cracked. The composition may be applied to provide a smooth surface, colored surface or textured surface. A portion or an entire surface of the substrate may be coated at one time. In addition or as an alternative, all or a portion of the surface may be coated more than one time to achieve the desired thickness, gloss, and/or surface effect. The amount of coverage obtained by a quantity of the paint composition will vary depending on the desire and/or condition of the surface to be covered and the thickness of the coating applied.

In a third aspect, the present invention provides uses of the coloured fiber cement products provided with a coating according to the present invention as a building material. These fiber cement building materials may be porous materials comprising one or more different materials such as a gypsum composite, cement composite, geopolymer composite or other composites having an inorganic binder. The surface of the material may be sanded, machined, extruded, molded or otherwise formed into any desired shape by various processes known in the art. The fiber cement building materials may be fully cured, partially cured or in the uncured "green" state. Fiber cement building materials may further include gypsum board, fiber cement board, fiber cement board reinforced by a mesh or continuous fibers, gypsum board reinforced by short fibers, a mesh or continuous fibers, inorganic bonded wood and fiber composite materials, geopolymer bonded wood and fiber boards, concrete roofing tile material, and fiber-plastic composite material.

In particular embodiments, the fiber cement products of the invention are fiber cement sheets produced by the processes of the present invention and can be used to provide an outer surface to walls, both internal as well as external a building or construction, e.g. as façade plate, siding, etc.

In particular embodiments, the fiber cement products of the invention are fiber cement sidings having a structured profile, such as a structured wood-like surface profile.

The invention claimed is:

1. Coloured fiber cement product, wherein said coloured fiber cement product is coloured in the mass and comprises on at least part of its outer surface, one or more cured layers of a transparent coating composition, said transparent coating composition comprises a binder and at least one transparent pigment, said transparent coating composition has a pigment volume concentration (PVC) of between 1% and 20%, and said product is a fiber cement sheet of fiber cement material provided with two main surfaces, and comprises on one of its main surfaces a non-radiation cured coloured first coating and thereon, said one or more cured layers of the transparent coating composition.

2. Coloured fiber cement product according to claim 1, wherein said one or more cured layers are radiation-cured.

3. Coloured fiber cement product according to claim 1, wherein said transparent coating composition further comprises at least one filler.

4. Coloured fiber cement product according to claim 1, wherein said at least one transparent pigment is an inorganic pigment.

5. Coloured fiber cement product according to claim 4, wherein said at least one transparent pigment is a transparent iron oxide pigment.

6. Coloured fiber cement product according to claim 1, wherein said binder is a radiation-cured polymer having ethylenically unsaturated double bonds, and said one or more cured layers of transparent coating composition are radiation-cured.

7. Coloured fiber cement product according to claim 1, wherein the PVC is in the range of 1-15%.

8. Coloured fiber cement product according to claim 7, wherein the PVC is in the range of 5-15%.

9. Process for producing a coloured fiber cement product, wherein said coloured fiber cement product is coloured in the mass and comprises on at least part of its outer surface, one or more cured layers of a transparent coating composition, said transparent coating composition comprises a binder and at least one transparent pigment, said transparent coating composition has a pigment volume concentration (PVC) of between 1% and 20%, and said product is a fiber cement sheet of fiber cement material provided with two main surfaces, and comprises on one of its main surfaces a non-radiation cured coloured first coating and thereon, said one or more cured layers of the transparent coating composition, said process comprising the steps of:

providing a fiber cement product that is coloured in the mass, applying to at least part of the outer surface of the coloured fiber cement product, one or more layers of transparent coating composition comprising a binder and at least one transparent pigment, wherein said transparent coating composition has a pigment volume concentration (PVC) of between 1% and 20%, and curing said one or more layers of said transparent coating composition to obtain a coated fiber cement product that is coloured in the mass.

10. Process according to claim 9, wherein said transparent coating composition further comprises a filler.

11. Process according to claim 9, wherein said at least one transparent pigment is an inorganic pigment.

12. Process according to claim 11, wherein said at least one transparent pigment is a transparent iron oxide pigment.

* * * * *